US009327772B2

(12) United States Patent
Ueda et al.

(10) Patent No.: US 9,327,772 B2
(45) Date of Patent: May 3, 2016

(54) CABIN DEVICE OF WORKING MACHINE

(71) Applicant: KUBOTA CORPORATION, Osaka (JP)

(72) Inventors: Masaaki Ueda, Osaka (JP); Kenichi Saiki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 14/177,731

(22) Filed: Feb. 11, 2014

(65) Prior Publication Data
US 2014/0292034 A1 Oct. 2, 2014

(30) Foreign Application Priority Data

Mar. 29, 2013 (JP) ................. 2013-074045

(51) Int. Cl.
B62D 33/06 (2006.01)
E02F 9/16 (2006.01)
B60J 1/00 (2006.01)
B62D 33/077 (2006.01)
E02F 9/08 (2006.01)

(52) U.S. Cl.
CPC ............... B62D 33/06 (2013.01); B60J 1/004 (2013.01); B62D 33/077 (2013.01); E02F 9/16 (2013.01); E02F 9/0808 (2013.01)

(58) Field of Classification Search
CPC ............ B60J 1/004; B60J 1/02; B62D 33/04; B62D 33/06; B62D 33/077; E02F 9/08; E02F 9/0808; E02F 9/0816; E02F 9/0858; E02F 9/16; E06B 3/54
USPC .............................. 296/190.08, 190.01, 190.1
See application file for complete search history.

(56) References Cited

U.S. PATENT DOCUMENTS

2002/0153748 A1* 10/2002 Sakyo et al. .............. 296/190.08
2009/0026803 A1* 1/2009 Yano et al. ................. 296/190.1
(Continued)

FOREIGN PATENT DOCUMENTS

JP 2000-96625 4/2000
JP 2002-161551 6/2002
(Continued)

OTHER PUBLICATIONS

English translation of JP 2003-020687; retreived Sep. 25, 2015 from the Japanese Platform for Patent information located at https://www.j-platpat.inpit.go.jp/web/all/top/BTmTopEnglishPage.*
Japanese Office Action issued in Japanese Application No. 2013-074045, dated Sep. 8, 2015.

Primary Examiner — Jason S Daniels
(74) Attorney, Agent, or Firm — Greenblum & Bernstein, P.L.C.

(57) ABSTRACT

A cabin is mounted on a device frame, and hydraulic equipment is placed on a pedestal of the device frame. In this configuration, an attachment body of a front lower part of the cabin is disposed and attached onto an installation part on a front part of the pedestal; providing a front cover between the front part of the pedestal and the front lower part of the cabin for covering forward and outward of the hydraulic equipment; and providing a front plate on the front lower part of the cabin for supporting a lower edge of a front glass. A vertically intermediate portion of an inner surface of the front plate is fixed to the attachment body, and a lower part of the front plate is placed on an upper side of the cover to thereby cover forward and upward of the installation part of the pedestal.

2 Claims, 8 Drawing Sheets

(56) References Cited

U.S. PATENT DOCUMENTS

2009/0243338 A1* 10/2009 Ueda et al. ............... 296/190.01
2013/0255911 A1* 10/2013 Matsumiya et al. ............ 165/41

FOREIGN PATENT DOCUMENTS

| JP | 2003-020687 | 1/2003 |
| WO | 2011/125415 | 10/2011 |

* cited by examiner

CABIN DEVICE OF WORKING MACHINE

TECHNICAL FIELD

The present invention relates to a cabin device of a working machine such as a travelable construction machine or an agricultural machine.

BACKGROUND ART

For example, as disclosed in Japanese Unexamined Patent Publication JP-A2000-96625, a working machine for construction such as a backhoe has a crawler travelling device and an excavation working device, mounting an engine and installing a working device while mounting a cabin which surrounds an operating device and driver's seat on a rotatable device frame, placing hydraulic equipment on a pedestal of the device frame, disposing and attaching an attachment body of a front lower part of the cabin onto an installation part on a front part of the pedestal, providing a front cover between the front part of the pedestal and the front lower part of the cabin for covering forward and outward of the hydraulic equipment, and providing a front plate on the front lower part of the cabin for supporting a lower edge of a front glass.

And the cabin is intended to be mounted on the device frame after assembled separately from a side of the device frame. The cabin has a structure that, a stepped part and attachment body of a floor seat on a bottom of the cabin are positioned lowermost, a lower edge of the front plate of the cabin is substantially at the same level in height as that of the stepped part, and the stepped part is placed immediately above the front cover.

SUMMARY OF INVENTION

Technical Problem

In this cabin of the conventional technique, the front plate supporting the lower edge of the front glass should be made using a plate material having a certain degree of vertical width in order to secure a supporting strength. And in the case where the lower part of this front plate is fixed to the attachment body, the lower edge of the front glass from the attachment body is to be largely separated upward from the stepped part, and this results in an obstacle of forward and downward visibility from the driver's seat.

Therefore, an essential object of the present invention is to provide a cabin device capable of solving such a conventional technical problem.

More specifically, the present invention is aimed to provide a cabin device of working machine allowing to enlarge forward and downward visibility of a front glass of a cabin by fixing an attachment body to an inner surface of a vertically intermediate portion of a front plate to thereby lower a position of this front plate.

Solution to Problem

Specific means of the present invention for solving the problem are as following.

In a first aspect of the present invention, a cabin device of a working machine includes:
a working device 3 installed on a device frame 2;
a cabin K which surrounds an operating device 4 and driver's seat 5, mounted on the device frame 2;
hydraulic equipment P placed on a pedestal 2A of the device frame 2, an attachment body 7 of a front lower part of the cabin K being disposed and attached onto an installation part 2B above a front part of the pedestal 2A;
a front cover 8 provided between the front part of the pedestal 2A and the front lower part of the cabin K for covering forward and outward of the hydraulic equipment P; and
a front plate 9 provided on the front lower part of the cabin K for supporting a lower edge of a front glass K1.

In this configuration, a vertically intermediate portion of an inner surface of the front plate 9 is fixed to the attachment body 7, and a lower part of the front plate 9 is placed on an upper side of the front cover 8 to thereby cover forward and upward of the installation part 2B of the pedestal 2A.

In a second aspect of the present invention, the cabin K has right and left supports K2, right and left end portions of the attachment body 7 are coupled to lower parts of the right and left supports K2, and a lower part outer surface portion K2a of each of the right and left supports K2 is extended below the attachment body 7 and adjacent to the lower part of the front plate 9.

In a third aspect of the present invention, a working device 3 for excavation is installed on a front part of the device frame 2, the cabin K has a stepped part 10 forward and downward the driver's seat 5, a front part of the stepped part 10 is coupled to the attachment body 7, and a front glass supporting part 11 of an upper part of the front plate 9 is placed in adjacent to the front part of the stepped part 10.

Advantageous Effects of Invention

According to the present invention, the forward and downward visibility of the front glass of the cabin can be enlarged.

Specifically, according to the first aspect of the present invention, since the vertically intermediate portion of the inner surface of the front plate 9 is fixed to the attachment body 7 and the lower part of the front plate 9 is placed on the upper side of the front cover 8 to thereby cover forward and upward of the installation part 2B of the pedestal 2A, the forward and downward visibility of the front glass K1 of the cabin K can be enlarged and the strength of the front plate 9 can be also improved compared to the conventional case of fixing the lower part of the front plate 9 to the attachment body 7.

According to the second aspect of the present invention, since the lower part outer surface portion K2a of the lower part of each of the right and left supports K2 of the cabin K is extended below the attachment body 7 and adjacent to the lower part of the front plate 9, protection of the right and left end portions of the lower part of the front plate 9 can be secured.

According to the third aspect of the present invention, since the front glass supporting part 11 of the upper part of the front plate 9 is placed in adjacent to the front part of the stepped part 10, the forward and downward visibility of the front glass K1 of the cabin K can be enlarged up to around a height level of the stepped part 10.

DESCRIPTION OF EMBODIMENTS

The following describes an embodiment of the present invention with reference to the drawings.

Figure 1:
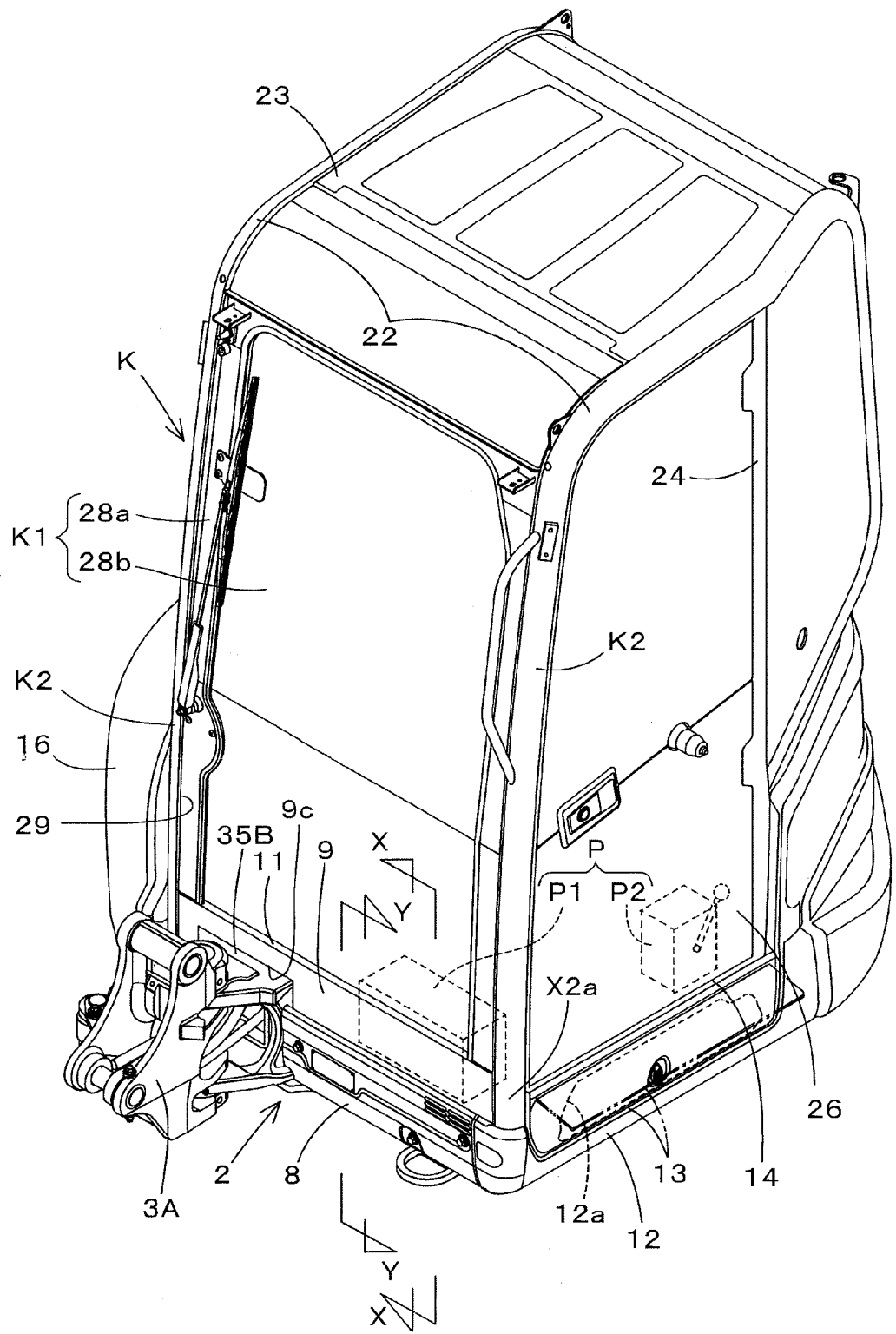
FIG. 1 is a perspective view of a working machine provided with a cabin device showing an embodiment of the present invention.
Figure 8:
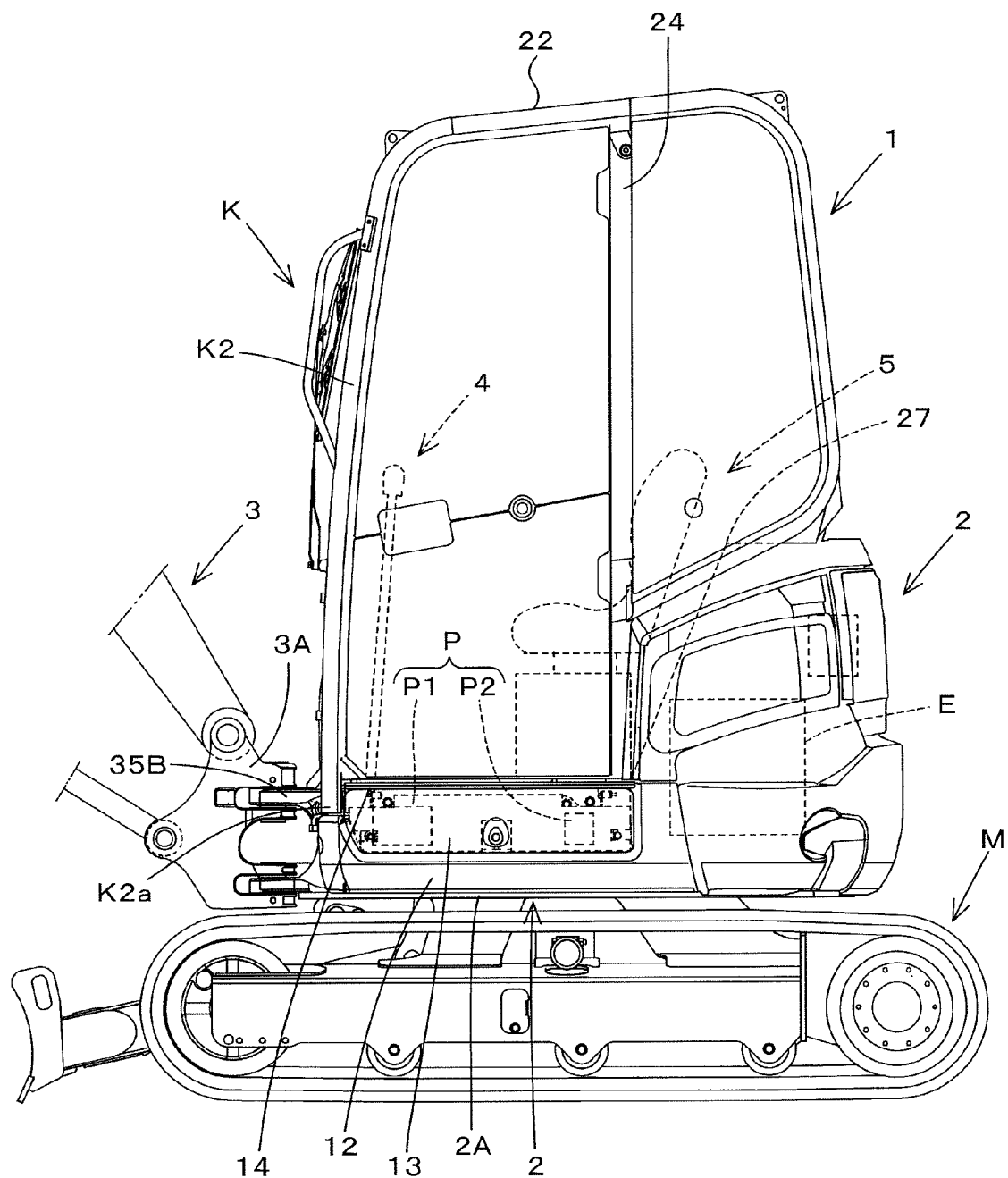
FIG. 8 is a side view of the working machine provided with the cabin.

In FIGS. 1 and 8, a rearward small-rotating type backhoe is shown as an example of a construction working machine 1. In this working machine 1, a device frame (i.e., rotating base) 2 is mounted on a crawler travelling machine M so as to be freely rotatable about a vertical axis, an excavating working machine 3 is installed on a front part of the device frame 2 and an engine E is mounted on a rear part thereof, and a cabin K surrounding an operating device 4 and a driver's seat 5 is mounted on the device frame 2 from the front part to the rear part thereof. Thus, the device frame 2 and a structure built thereon constitute an upper structure of the working machine 1.

On an upper surface of a pedestal 2A of the device frame 2, a hydraulic motor for rotation is placed in the vicinity of the middle part thereof and hydraulic equipment P including such as a control valve P1 and an operation mode switching valve P2 (which is so-called a third line valve for performing a switch and drain of a driving operation pattern) is placed on a left side thereof.

Further, vehicle equipment such as a hydraulic tank is mounted on a right side of the device frame 2 and is covered with a tank cover 16. In addition, a front cover 8 and a side cover 12 are provided on an upper surface side of the pedestal 2A of the device frame 2 for covering an outer-sideward of the hydraulic equipment P.

In FIGS. 1 to 8, the front cover 8 is fixed to the front part of the pedestal 2A via a stay and the side cover 12 is fixed to the side of the pedestal 2A via the stay 15. The side cover 12 has an opening 12a opened widely from the front part to the rear part thereof and this side cover 12 is freely opened and closed by an opening/closing lid 13. An upper edge member 14 is provided above the side cover 12 for use as an auxiliary step.

The cabin K is configured in a manner such that: right and left side frames 22 formed with different shaped pipes are coupled with each other by such as a roof member 23 and a floor sheet 27 on the bottom; a top end of an intermediate support 24 coupled with a back-and-forth intermediate portion of each of the right and left side frames 22; right and left supports K2 are formed in the front parts of the right and left side frames 22; a front and lower edge of each of the supports K2 and a lower edge of the intermediate support 24 are coupled by a lower side frame member 25 made of a pipe; and a front glass K1, rear glass, side glass and the like are attached between these frame members.

A platform R is formed between the front part of the left side frame 22 and the intermediate support 24, and the left intermediate support 24 is provided with a door 26 for opening and closing the platform R.

The front glass K1 is configured to be an opening/closing type, and a glass 28b is fitted into a window frame 28a, right and left side parts of the window frame 28a are supported by a pair of rails provided in the right and left supports K2, and thus the front glass K1 is configured to be capable of opening/closing movement in a way of being lifted upward from a posture of closing a front opening 29 of the cabin K, i.e., a posture shown in FIG. 1, to a posture of opening the front opening 29.

A bottom of the cabin K is formed of a floor sheet 27, the driver's seat 5 is mounted on a rear and upper portion of the floor sheet 27, the operating device 4 is placed in the right and left and/or forward of the driver's seat 5, and a front and lower part of the driver's seat 5 is formed to be a stepped part 10.

The cabin K having the driver's seat 5 and operating device 4 built-in the same is assembled separately from the device frame 2 and the structure thereon, and then the cabin K in the assembled state is attached onto the device frame 2 via a cushion.

Figure 2:
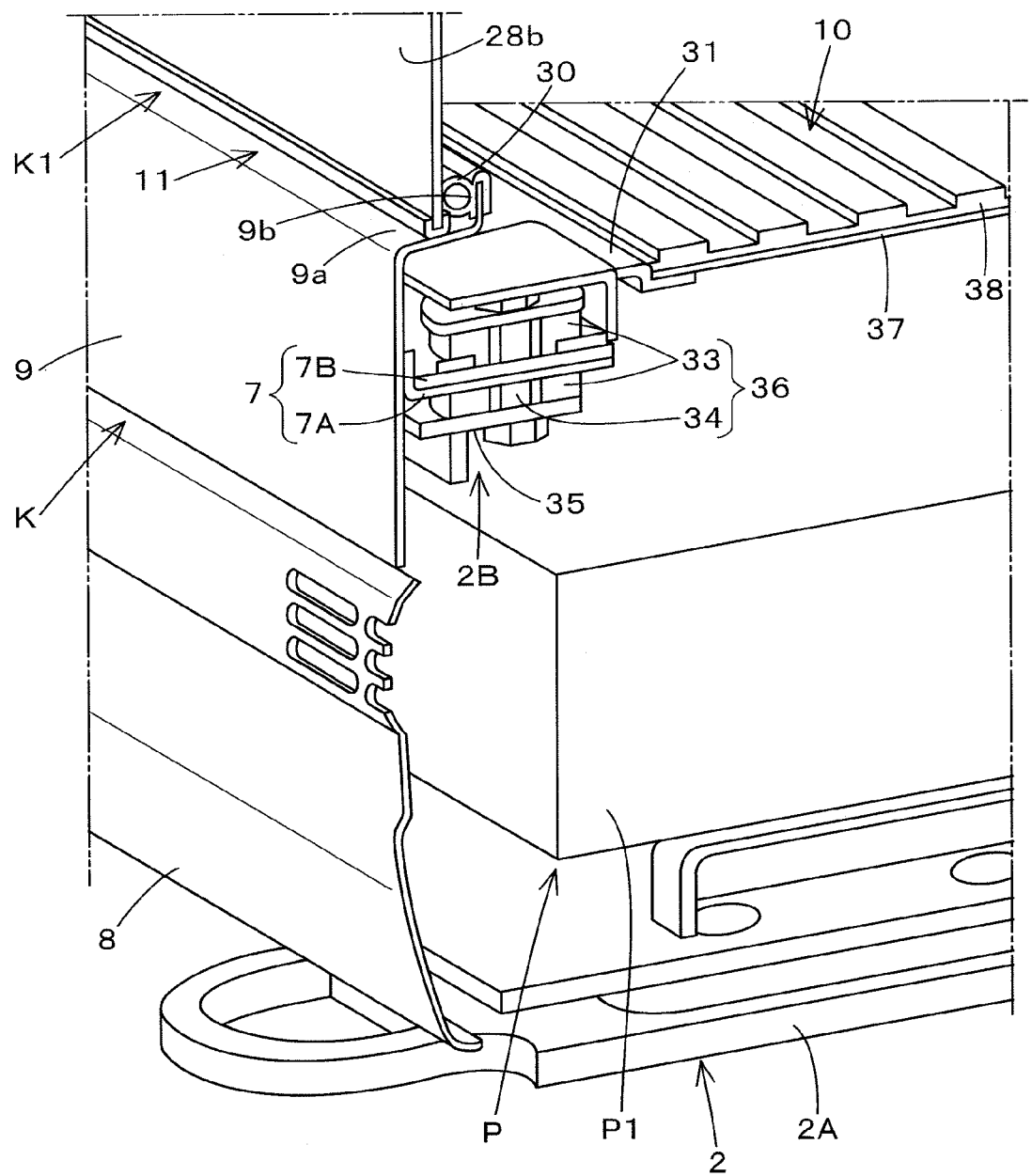
FIG. 2 is a cross-sectional view along a line X-X shown in FIG. 1.
Figure 3:
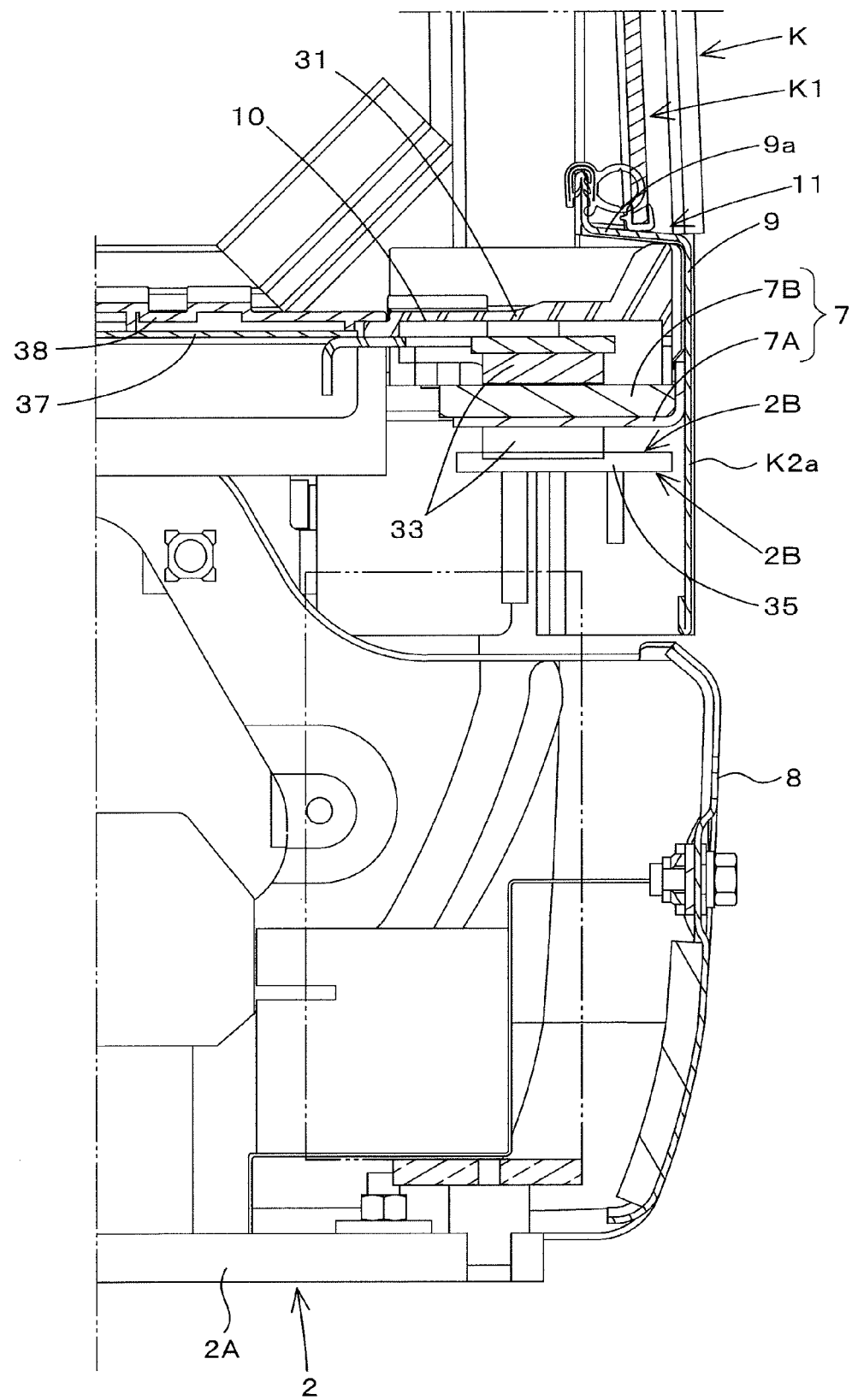
FIG. 3 is a cross-sectional view along a line Y-Y shown in FIG. 1.
Figure 4:
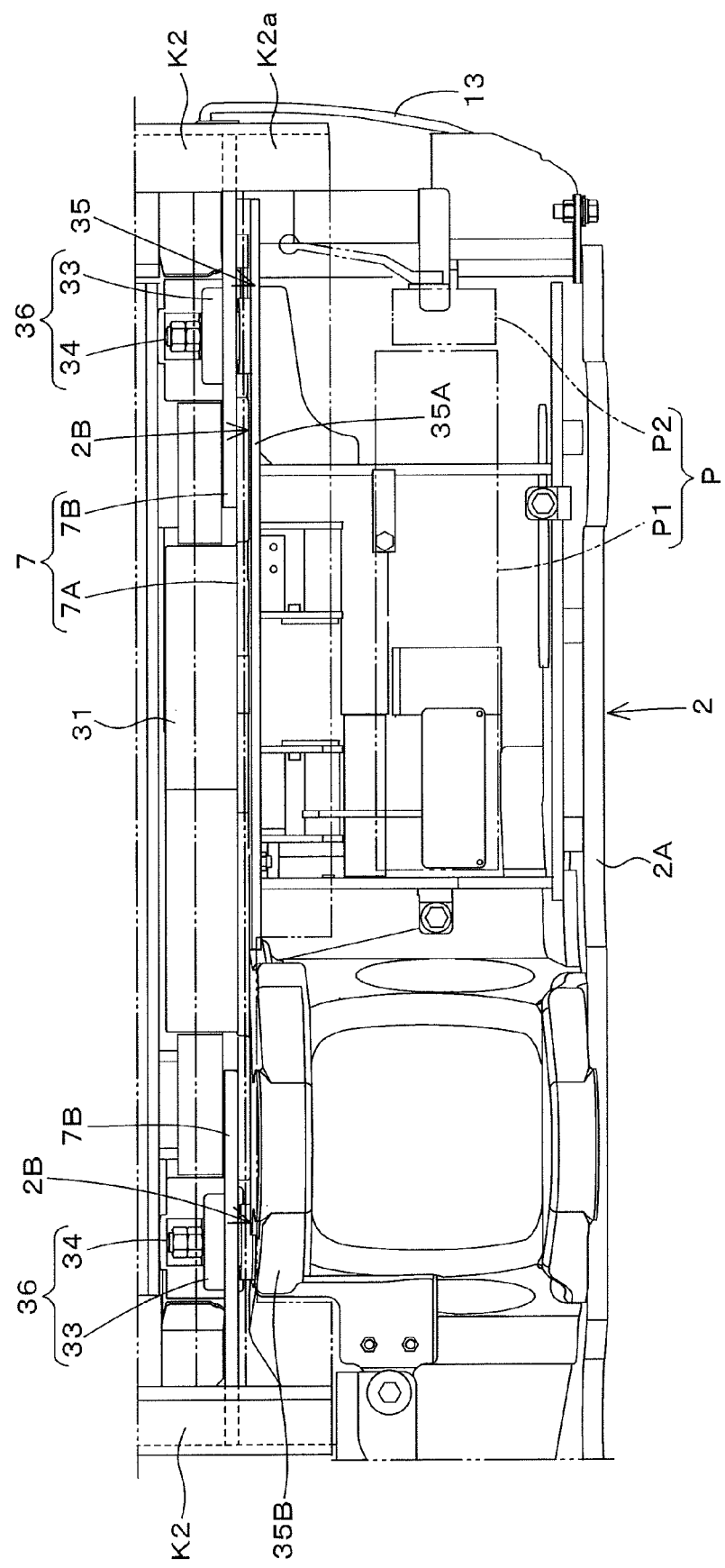
FIG. 4 is a front view of a device frame and cabin with its front plate and front cover removed.
Figure 5:
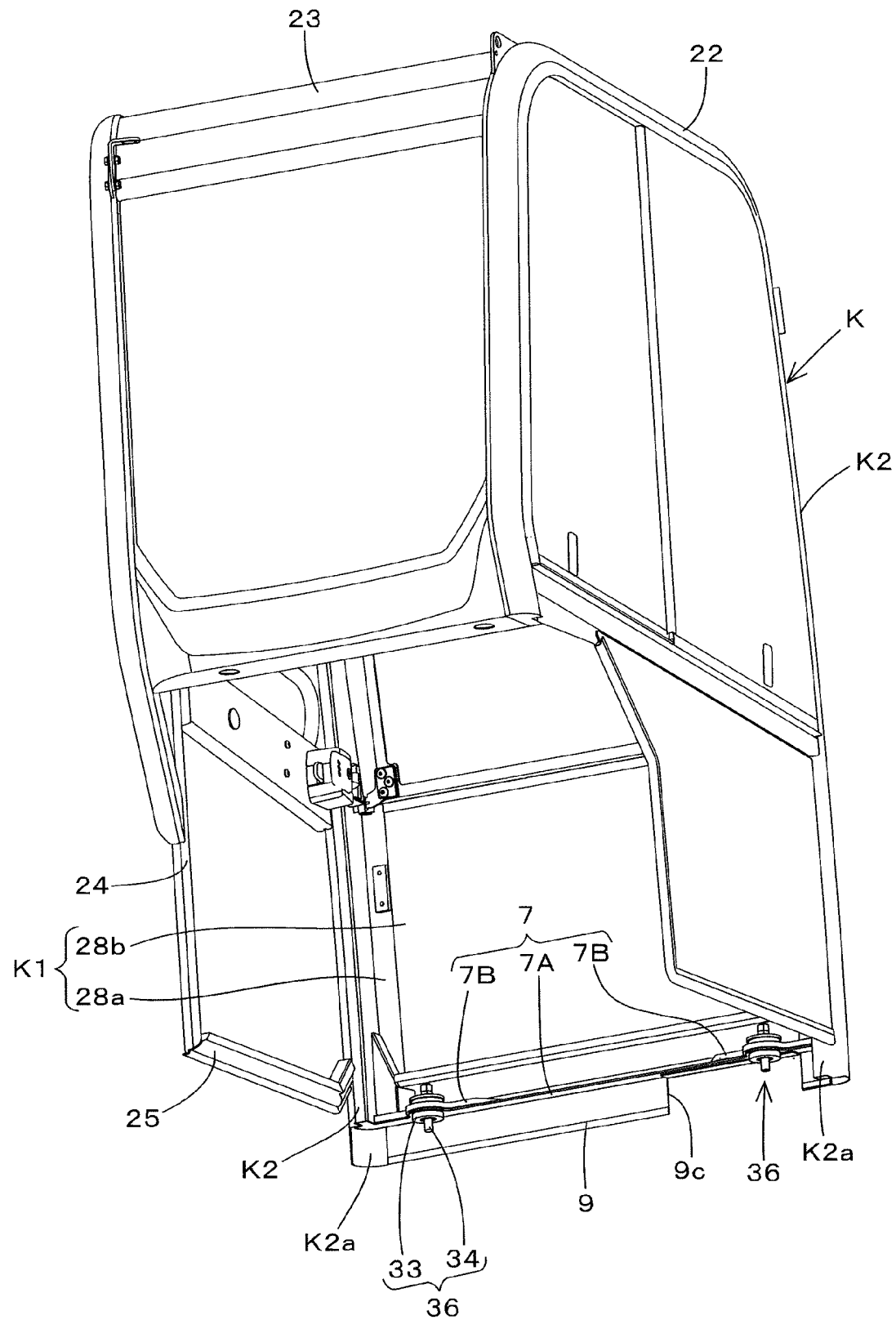
FIG. 5 is a perspective view seeing the cabin from a rear and lower position.
Figure 6:
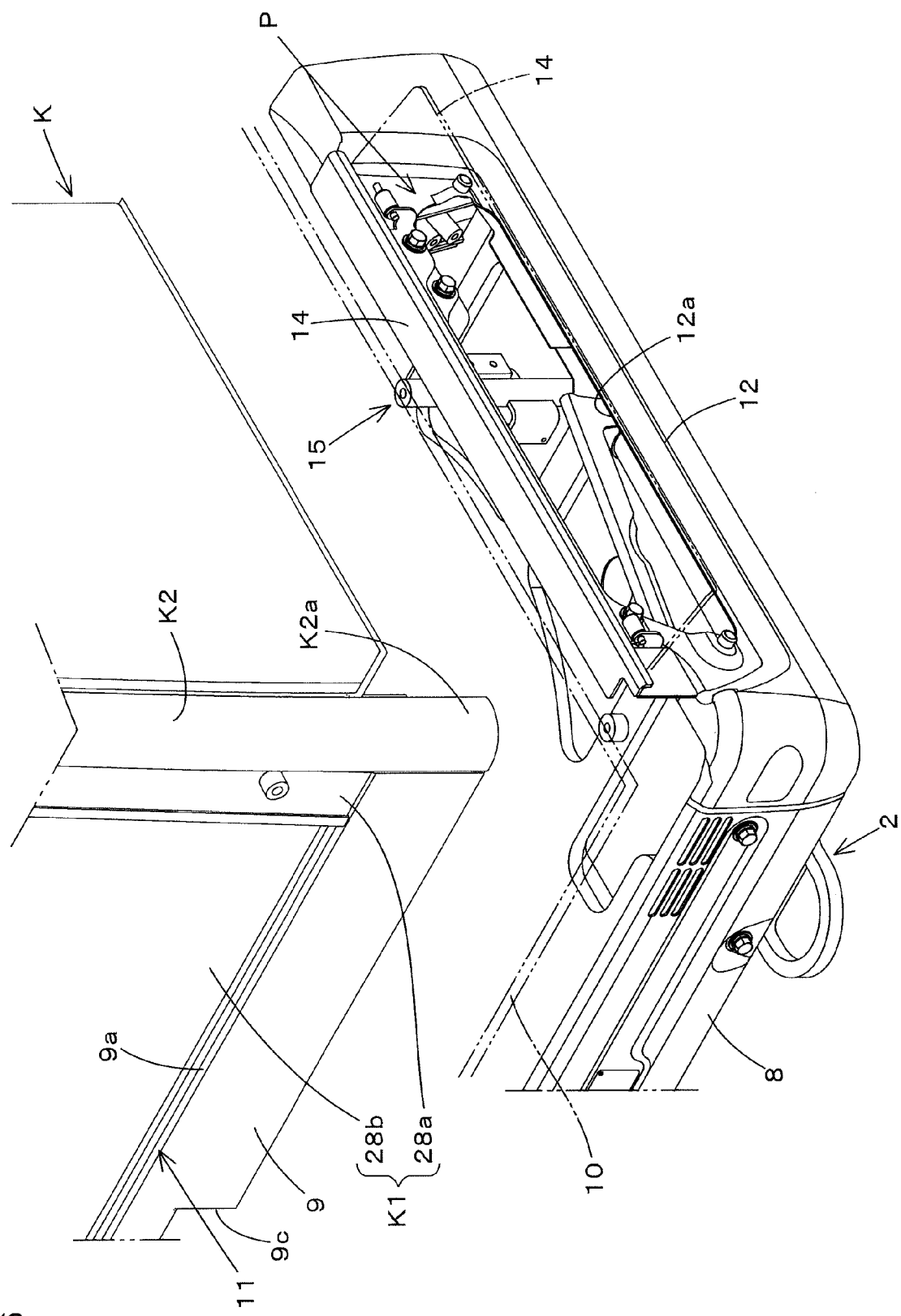
FIG. 6 is an exploded perspective view of main parts of the device frame and cabin.
Figure 7:
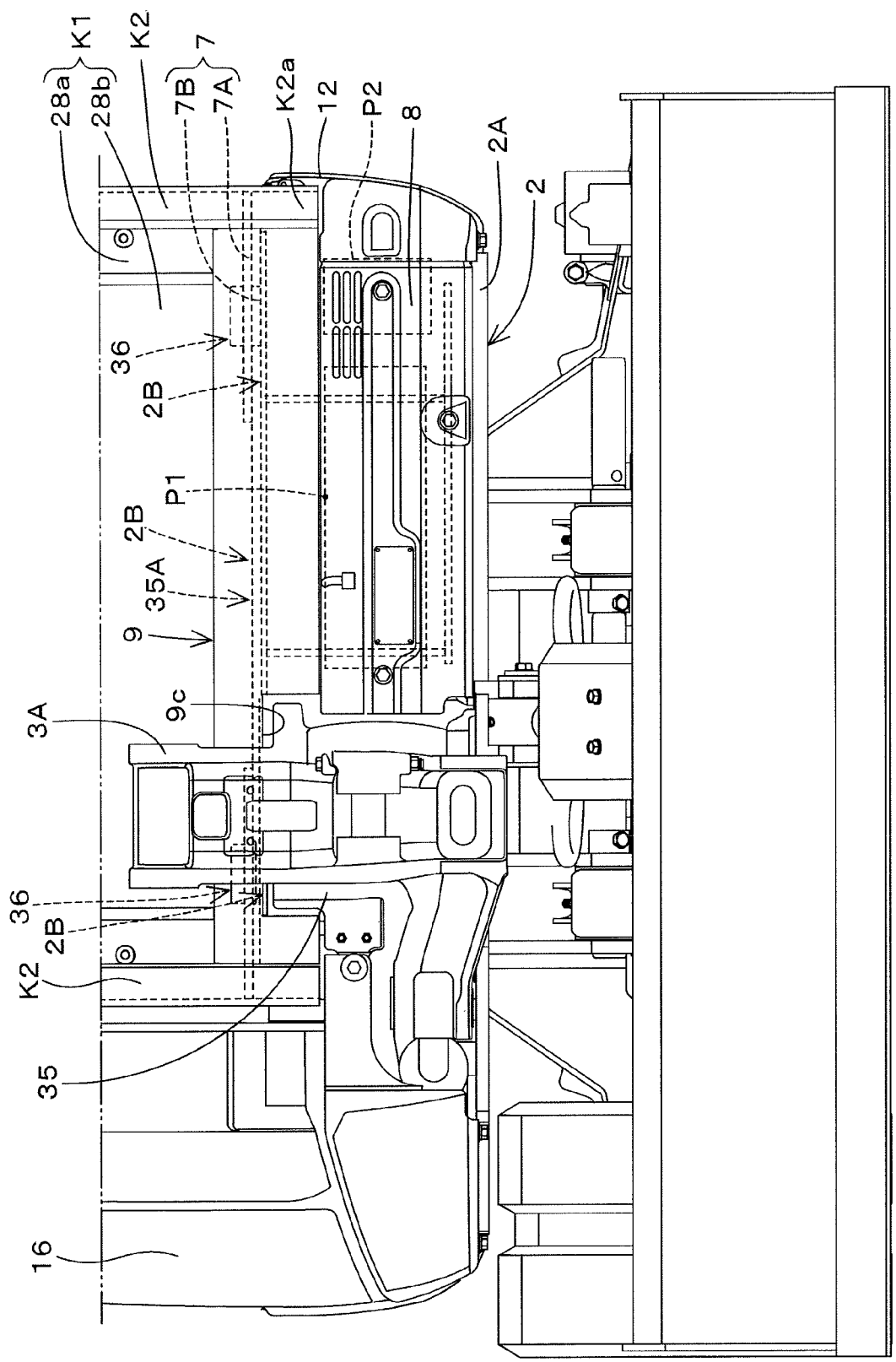
FIG. 7 is a front view of the device frame and cabin.

The front plate 9 is provided in the front and lower part of the cabin K for supporting the lower edge of the front glass K1 between the lower parts of the right and left supports K2. This front plate 9 is formed by press-working of a flat plate, and as shown in FIGS. 2 and 3, a substantially horizontal upper surface part 9a is formed with its upper part bent in an L character shape inwardly the cabin in a side surface shape in cross section, standing from an inner edge of this upper surface part 9a to form a standing edge part 9b, and a weatherstrip 30 abutting to the front glass K1 is installed to the standing edge part 9b. A front glass support part 11 is formed of the upper surface part 9a and standing edge part 9b of the front plate 9.

A vertically intermediate portion of the inner surface of the front plate 9 is fixed to an attachment body 7. This attachment body 7 has a band plate 7A and base plate 7B, a front part of the band plate 7A standing in an L character shape being securely adhered to the front plate 9 and the base plate 7B being fixed to an upper side of a horizontal part of the band plate 7A.

The base plate 7B is formed of a plate thicker than the band plate 7A, and there are provided a pair of right and left base plates 7B each of which is fixed to the band plate 7A, an outer end portion of the left side base plate 7B being fixed to the lower edge of the left support K2 while an outer end portion of the right side base plate 7B being fixed to the lower edge of the right support K2.

The attachment body 7 couples the lower parts of the right and left supports K2 to form a front and lower frame member of the cabin K to which a stepped front member 31 is disposed and installed for forming a front part of the stepped part 10 so as to extend across the right and left base plates 7B.

The attachment body 7 is provided with cushion members 33 which are placed on the upper and lower surface sides thereof and a bolt 34 is vertically penetrated through the assembly of the attachment body 7 together with the cushion members 33 and this bolt 34 is fixed to a support base 35 of the front upper part of the base plate 2A. Thus, the assembly of the attachment body 7 together with the cushion members 33 is attached to the device frame 2. A cabin installation instrument 36 is configured by the cushion members 33, bolt 34, and the like.

A frame shaped support base 35A is provided on a left front part of the base plate 2A for attaching the hydraulic equipment P and for supporting a pedal of the operating device 4. A working device support base 35B is provided in a front part of a laterally intermediate portion of the device frame 2 in order to pivotally support a swing bracket 3A of the working device 3 via a vertical shaft. Thus, the both right and left side parts of the attachment body 7 are respectively disposed on the upper surfaces of the support base 35A and the working device support base 35B to be fixed via the cabin attachment instrument 36.

The upper surfaces of the support base 35A and working device support base 35B in the front part of the device frame 2 respectively constitute right and left installation parts 2B for disposing the attachment body 7 to be attached. The front of these right and left installation parts 2B and cabin installation instrument 36 is covered by the front plate 9 to thereby prevent entry of rainwater and the like.

In the lower side than the vertically intermediate portion of the front plate 9 to which the attachment body 7 is fixed, a notch portion 9c is formed in a part corresponding to the working device support base 35B provided in the front part of the device frame 2, and a lower part of the front plate 9 is located in the laterally sideward of the working device support base 35B. The right and left parts of the notch portion 9c formed in the front plate 9 are located substantially immediately above the front cover 8 and are coplanar with the surface of the front cover 8.

The right and left supports K2 of the cabin K are respectively formed of different shaped pipes and the lower parts thereof are coupled with an end portion of the attachment body 7. In this configuration, a lower part than the coupling position with the attachment body 7 has a cabin inside portion of the different shaped pipes removed, and only an arc-shaped outer peripheral surface is extended downward to thereby form a lower part outer surface portion K2a.

This lower part outer surface portion K2a is adjacent to each of the right and left end portions of the lower part of the front plate 9 to thereby form a smooth surface from the front surface of the cabin to a corner surface, thereby protecting a side end of the lower part of the front plate 9.

The stepped part 10 is formed of the stepped front member 31, stepped plate 37 and the like. In this configuration, the stepped plate 37 is freely attachable and detachable to and from the stepped front member 31. In the case of performing maintenance of the hydraulic motor for rotation and the like, the stepped plate 37 is detached and release upward the device frame 2. A foot rest mat 38 is disposed on the stepped plate 37.

The front part of the stepped front member 31 is adjacent to the front plate 9 and is placed in adjacent to downward a substantially horizontal upper surface 9a. In other words, the standing edge part 9b serving as the front glass support part 11 which abuts to the front glass K1 is placed in adjacent to the front part of the stepped part 10, and the lower edge of the front glass K1 is made as close as possible to the height level of the front part of the stepped part 10. Thus, a front and lower limit of the visibility becomes in the same level as the height level of the front part of the stepped part 10, and the front and downward visibility can be enlarged.

Since the lower part of the front plate 9 is located below the attachment body 7, the front plate 9 covers the right and left installation parts 2B and cabin installation instrument 36, and at the same time, a vertical width of the front cover 8 can be made narrow, whereby there can be also obtained visual effects such that: a vertical width of the device frame 2 can be made narrow, the center of gravity of the device frame 2 is low, a vertical height of a living space within the cabin K is wide, and the like.

It is noted that the shapes and front and rear, lateral and vertical positional relationships of the respective members in the embodiment of the present invention are the best mode when constituted as shown in FIGS. 1 to 8. However, the present invention should not be limited to the above embodiment, and various modifications and combination of the members and configuration can be made.

For example, the attachment body 7 may be formed of only the base plate 7B of a length extending between the right and left supports K2, and the front glass K1 may be fitting typed one without opening and closing and the lower edge thereof may be supported by the upper edge of the front plate 9.

The installation part 2B in the front part of the device frame 2 may be formed by providing a base dedicated to the cabin in the front part of the pedestal 2A.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese application No. 2013-074045 is hereby incorporated by reference.

The invention claimed is:

1. A cabin arrangement of a working machine having a device frame and a working device disposed on the device frame, the cabin arrangement comprising:
    a cabin disposed on the device frame, the cabin being configured to surround an operating device and a driver's seat, the cabin including:
        a right support and a left support, the right support and the left support each having a lower part outer surface portion;
    a pedestal provided on a lower portion of the device frame;
    a hydraulic equipment disposed on the pedestal;
    an installation part provided above a front part of the pedestal;
    an attachment body provided on a front lower part of the cabin, the attachment body being disposed on the installation part, the attachment body being coupled at least to a lower part of the right support at a right end portion of the attachment body or to a lower part of the left support at a left end portion of the attachment body;
    a front cover provided between the front part of the pedestal and the front lower part of the cabin, the front cover being configured to cover a front outside of the hydraulic equipment;
    a front glass provided on a front lower part of the cabin; and
    a front plate disposed above the front cover and fixed to the attachment body at an intermediate portion on the front plate, the intermediate portion being intermediate between ends of the front plate in a vertical direction, the front plate including:
        a first plate provided between the front glass and the front cover; an upper surface part serving as a second plate, the upper surface part extending from an upper part of the first plate toward an inside of the cabin; and
        a standing edge part serving as a third plate, the standing edge part standing upward from an end of the upper surface part,
    the front plate supporting a lower edge of the front glass on the upper surface part in front of the standing edge part and covering front of the installation part of the pedestal,
    wherein
    the lower part outer surface portions of the right support and the left support are extended downward lower than the attachment body and are adjacent to a lower part of the front plate,
    the attachment body includes:
        a band plate provided extending between the right support and the left support and fixed to the intermediate portion on the front plate; and
        a base plate overlapped on the band plate at an intermediate portion on the band plate, the intermediate portion being intermediate between ends of the band plate in a longitudinal direction, and the base plate is attached to the installation part together with the band plate.

2. The cabin arrangement of a working machine according to claim 1, wherein the device frame installs the working device for excavation on a front part of the device frame, the cabin has a stepped part on a front lower part of the driver's seat, the stepped part is coupled to the attachment body at a front part of the stepped part, and the upper surface part and the standing edge part constitute a front glass supporting part, the front glass supporting part being disposed adjacent to the front part of the stepped part.

* * * * *